(12) United States Patent
Song et al.

(10) Patent No.: US 11,499,739 B2
(45) Date of Patent: Nov. 15, 2022

(54) AIR CONDITIONER AND CONTROL METHOD THEREOF

(71) Applicant: Samsung Electronics Co., Ltd., Suwon-si (KR)

(72) Inventors: Hyungseon Song, Suwon-si (KR); Soonhyung Gwon, Seongnam-si (KR); Tan Kim, Suwon-si (KR); Dongjun Shin, Suwon-si (KR); Hyunwoo Ock, Suwon-si (KR); Minkyong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 17/050,984

(22) PCT Filed: May 14, 2019

(86) PCT No.: PCT/KR2019/005772
§ 371 (c)(1),
(2) Date: Oct. 27, 2020

(87) PCT Pub. No.: WO2019/221479
PCT Pub. Date: Nov. 21, 2019

(65) Prior Publication Data
US 2021/0231336 A1      Jul. 29, 2021

(30) Foreign Application Priority Data
May 18, 2018    (KR) .......................... 10-2018-0057458

(51) Int. Cl.
*F24F 11/58*         (2018.01)
*F24F 11/63*         (2018.01)
(Continued)

(52) U.S. Cl.
CPC .............. *F24F 11/63* (2018.01); *F24F 11/58* (2018.01); *G05B 13/0265* (2013.01);
(Continued)

(58) Field of Classification Search
CPC .................................. F24F 11/58; F24F 11/63
See application file for complete search history.

(56) References Cited

U.S. PATENT DOCUMENTS 9,073,405 B2    7/2015   Choi et al.
9,623,721 B2    4/2017   Kim
(Continued)

FOREIGN PATENT DOCUMENTS

CN       102748833 A      10/2012
CN       103994552 A      8/2014
(Continued)

OTHER PUBLICATIONS

Chinese Office action dated Oct. 9, 2021, issued in Chinese Application No. 201980033343.9.
(Continued)

*Primary Examiner* — Mark A Connolly
(74) *Attorney, Agent, or Firm* — Jefferson IP Law, LLP

(57) ABSTRACT

The present disclosure provides an air conditioner and a control method thereof. The control method of the air conditioner is capable of acquiring a voice of a user including a state of the user, transmitting the voice of the user to an external server, receiving, from the external server, a control command acquired by using a cooling tendency of the user and the state of the user determined on the basis of a usage history of the air conditioner, and controlling the air conditioner on the basis of the control command. In particular, at least a part of a method of acquiring a control command on the basis of a cooling tendency of a user may use an artificial intelligence model trained according to at (Continued)

least one of machine learning, a neural network, and deep learning algorithms.

13 Claims, 12 Drawing Sheets

(51) Int. Cl.
*G05B 13/02* (2006.01)
*G10L 15/22* (2006.01)
*G10L 15/30* (2013.01)
*F24F 140/60* (2018.01)
*F24F 120/20* (2018.01)
*F24F 110/40* (2018.01)
*F24F 110/10* (2018.01)

(52) U.S. Cl.
CPC .............. *G10L 15/22* (2013.01); *G10L 15/30* (2013.01); *F24F 2110/10* (2018.01); *F24F 2110/40* (2018.01); *F24F 2120/20* (2018.01); *F24F 2140/60* (2018.01); *G10L 2015/223* (2013.01)

(56) References Cited

U.S. PATENT DOCUMENTS

| | | | |
|---|---|---|---|
| 9,880,808 B2 | 1/2018 | Park et al. | |
| 10,811,002 B2 | 10/2020 | Cho et al. | |
| 2010/0070089 A1* | 3/2010 | Harrod ................. | G05B 19/042 700/277 |
| 2014/0114532 A1 | 4/2014 | Choi et al. | |
| 2014/0167931 A1 | 6/2014 | Lee et al. | |
| 2014/0191949 A1 | 7/2014 | Park et al. | |
| 2016/0363944 A1 | 12/2016 | Kim et al. | |
| 2017/0133009 A1 | 5/2017 | Cho et al. | |

FOREIGN PATENT DOCUMENTS

| | | |
|---|---|---|
| CN | 105027574 A | 11/2015 |
| CN | 106871366 A | 6/2017 |
| CN | 107735738 A | 2/2018 |
| JP | 09-189427 A | 7/1997 |
| JP | 2014-224619 A | 12/2014 |
| JP | 2016-083984 A | 5/2016 |
| KR | 10-2008-0096239 A | 10/2008 |
| KR | 10-2015-0015886 A | 2/2015 |
| KR | 10-1551028 B1 | 9/2015 |
| KR | 10-1670610 * | 10/2016 |
| KR | 10-1670610 B1 | 10/2016 |
| KR | 10-2017-0054707 A | 5/2017 |
| KR | 10-2017-0073175 B1 | 6/2017 |
| KR | 10-2017-0075597 A | 7/2017 |
| KR | 10-1835085 B1 | 3/2018 |
| KR | 10-2018-0049471 A | 5/2018 |
| WO | 2013/008996 A1 | 1/2013 |
| WO | 2015/088141 A1 | 6/2015 |

OTHER PUBLICATIONS

European Search Report, dated Jun. 7, 2021, issued in European Application No. 19804010.7.
Korean Office Action with English translation dated Jun. 4, 2022; Korean Appln. No. 10-2018-0057458.

* cited by examiner

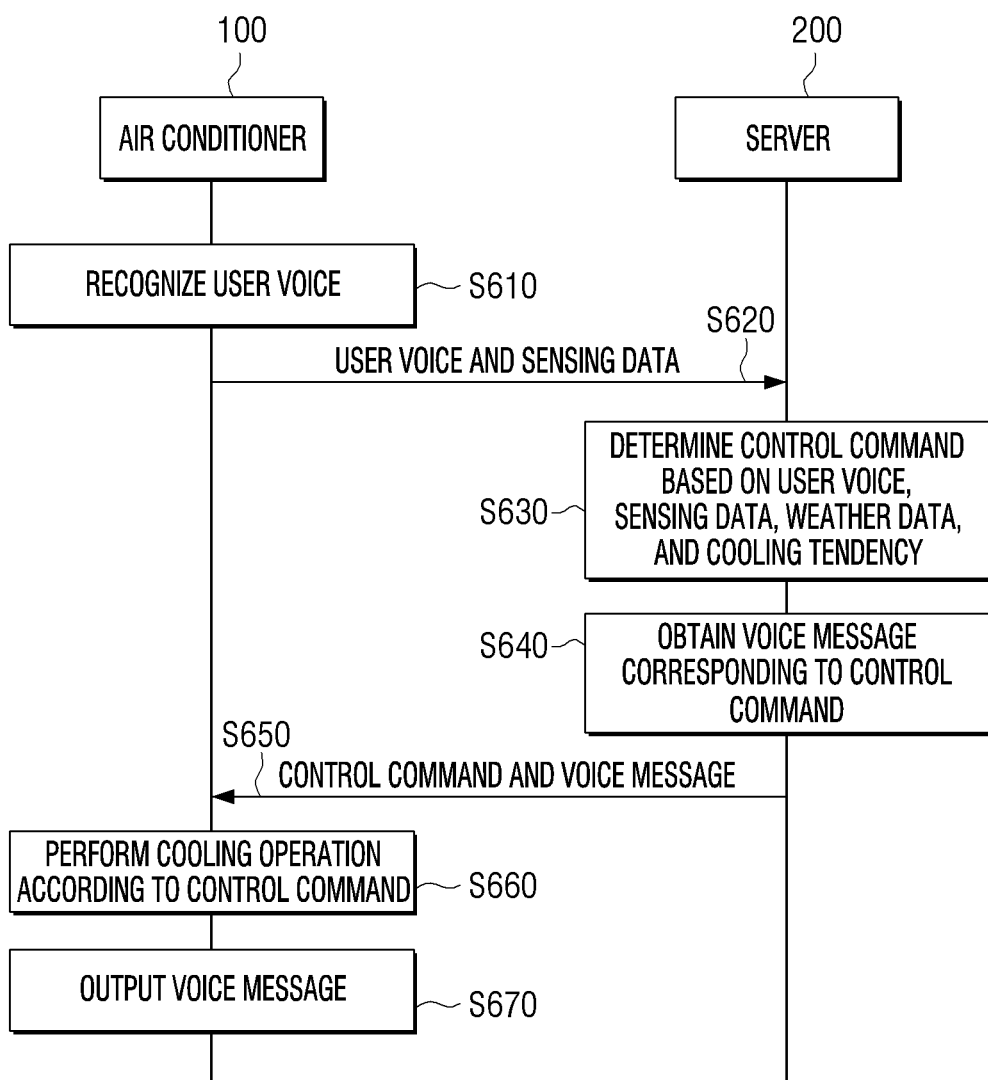

FIG. 7

| Utterance | Context | User pattern | TTS & Action | Preference | deltaDT | desiredT | mode | Comode | deltaSpeed Level |
|---|---|---|---|---|---|---|---|---|---|
| IT IS VERY HOT | All | All | CHANGING TO SPEED OPERATION FOR RAPID COOLING | VeryHot | - | - | Cool | Comode_Speed | - |
| IT IS HOT | Desired temp > Preference temp | 1)HIGH TEMPERATURE AND LOW SPEED | LOWERING TEMPERATURE BY (SET TEMPERATURE ? PREFERENCE TEMPERATURE) ACCORDING TO ARTIFICIAL INTELLIGENCE PATTERN ANALYSIS RESULT | Hot_Conditional2_HTLS | -(dT-prefT) | - | - | - | - |
| | | 2)HIGH TEMPERATURE AND HIGH SPEED | LOWERING TEMPERATURE BY (SET TEMPERATURE ? PREFERENCE TEMPERATURE) AND INCREASING WIND STRENGTH ACCORDING TO ARTIFICIAL INTELLIGENCE PATTERN ANALYSIS RESULT | Hot_Conditional2_HTLS | -(dT-prefT) | - | - | - | 1 |
| | | 3)LOW TEMPERATURE AND LOW SPEED | LOWERING TEMPERATURE BY (SET TEMPERATURE ? PREFERENCE TEMPERATURE) ACCORDING TO ARTIFICIAL INTELLIGENCE PATTERN ANALYSIS RESULT | Hot_Conditional2_HTLS | -(dT-prefT) | - | - | - | - |
| | | 4)LOW TEMPERATURE AND HIGH SPEED | LOWERING TEMPERATURE BY (SET TEMPERATURE ? PREFERENCE TEMPERATURE) AND INCREASING WIND STRENGTH ACCORDING TO ARTIFICIAL INTELLIGENCE PATTERN ANALYSIS RESULT | Hot_Conditional2_HTLS | -(dT-prefT) | - | - | - | 1 |
| | Desired temp = < Preference temp | 1)HIGH TEMPERATURE AND LOW SPEED | LOWERING SET TEMPERATURE BY 1 DEGREE ACCORDING TO ARTIFICIAL INTELLIGENCE PATTERN ANALYSIS RESULT | Hot_Conditional3_HTLS | -1 | - | - | - | - |
| | | 2)HIGH TEMPERATURE AND HIGH SPEED | LOWERING SET TEMPERATURE BY 1 DEGREE AND INCREASING WIND STRENGTH ACCORDING TO ARTIFICIAL INTELLIGENCE PATTERN ANALYSIS RESULT | Hot_Conditional3_HTLS | -1 | - | - | - | 1 |
| | | 3)LOW TEMPERATURE AND LOW SPEED | LOWERING SET TEMPERATURE BY 2 DEGREES ACCORDING TO ARTIFICIAL INTELLIGENCE PATTERN ANALYSIS RESULT | Hot_Conditional3_HTLS | -2 | - | - | - | - |
| | | 4)LOW TEMPERATURE AND HIGH SPEED | LOWERING SET TEMPERATURE BY 2 DEGREES AND INCREASING WIND STRENGTH ACCORDING TO ARTIFICIAL INTELLIGENCE PATTERN ANALYSIS RESULT | Hot_Conditional3_HTLS | -2 | - | - | - | 1 |
| IT IS COLD | Desired temp > Current temp | All | CHANGING TO WINDLESS OPERATION | Hot_Conditional5_HTLS | - | - | - | - | - |
| | Desired temp < Preference temp | 1)HIGH TEMPERATURE AND LOW SPEED | INCREASING TEMPERATURE BY (SET TEMPERATURE ? PREFERENCE TEMPERATURE) AND CHANGING TO WINDLESS MODE ACCORDING TO ARTIFICIAL INTELLIGENCE PATTERN ANALYSIS RESULT | Hot_Conditional4_HTLS | -(dT-prefT) | - | Cool | Comode_Speed | - |
| | | 2)HIGH TEMPERATURE AND HIGH SPEED | INCREASING TEMPERATURE BY (SET TEMPERATURE ? PREFERENCE TEMPERATURE) AND CHANGING TO WINDLESS MODE ACCORDING TO ARTIFICIAL INTELLIGENCE PATTERN ANALYSIS RESULT | Hot_Conditional4_HTLS | -(dT-prefT) | - | Cool | Comode_Speed | - |
| | | 3)LOW TEMPERATURE AND LOW SPEED | INCREASING TEMPERATURE BY (SET TEMPERATURE ? PREFERENCE TEMPERATURE) AND CHANGING TO WINDLESS MODE ACCORDING TO ARTIFICIAL INTELLIGENCE PATTERN ANALYSIS RESULT | Hot_Conditional4_HTLS | -(dT-prefT) | - | Cool | Comode_Speed | - |
| | | 4)LOW TEMPERATURE AND HIGH SPEED | INCREASING TEMPERATURE BY (SET TEMPERATURE ? PREFERENCE TEMPERATURE) AND LOWERING WIND STRENGTH ACCORDING TO ARTIFICIAL INTELLIGENCE PATTERN ANALYSIS RESULT | Hot_Conditional4_HTLS | -(dT-prefT) | - | - | - | -1 |
| | Desired temp = > Preference temp | 1)HIGH TEMPERATURE AND LOW SPEED | INCREASING SET TEMPERATURE BY 2 DEGREES AND CHANGING TO WINDLESS MODE ACCORDING TO ARTIFICIAL INTELLIGENCE PATTERN ANALYSIS RESULT | Hot_Conditional6_HTLS | 2 | - | Cool | Comode_Speed | - |
| | | 2)HIGH TEMPERATURE AND HIGH SPEED | INCREASING SET TEMPERATURE BY 2 DEGREES ACCORDING TO ARTIFICIAL INTELLIGENCE PATTERN ANALYSIS RESULT | Hot_Conditional6_HTLS | 2 | - | - | - | - |
| | | 3)LOW TEMPERATURE AND LOW SPEED | CHANGING TO WINDLESS MODE ACCORDING TO ARTIFICIAL INTELLIGENCE PATTERN ANALYSIS RESULT | Hot_Conditional6_HTLS | - | - | Cool | Comode_Speed | - |
| | | 4)LOW TEMPERATURE AND HIGH SPEED | LOWERING WIND STRENGTH ACCORDING TO ARTIFICIAL INTELLIGENCE PATTERN ANALYSIS RESULT | Hot_Conditional6_HTLS | - | - | - | - | -1 |
| IT IS VERY COLD | All | All | CHANGING TO WINDLESS MODE | VeryCold | - | - | - | - | - |

710 720 730 740 750

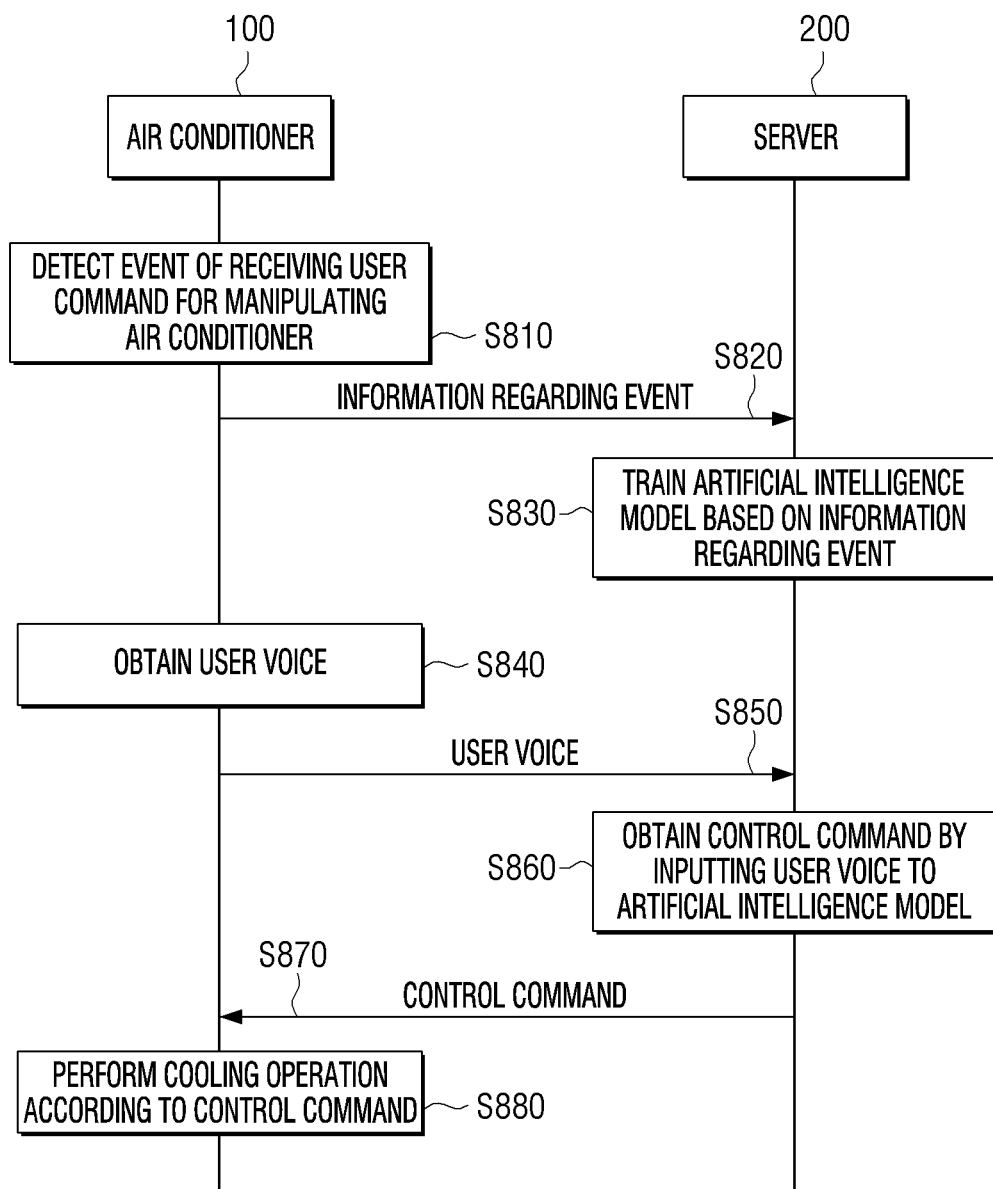

AIR CONDITIONER AND CONTROL METHOD THEREOF

TECHNICAL FIELD

The disclosure relates to an air conditioner and a control method thereof, and more particularly, relates to an air conditioner controlling the air conditioner according to a cooling tendency of a user determined based on a usage history of the air conditioner of the user and a control method thereof.

BACKGROUND ART

Air conditioners such as coolers have become one of daily necessaries along with improvement of standards of living. In the related art, in order to operate such an air conditioner, buttons provided on a main body of the air conditioner or a remote controller for manipulating the air conditioner was used.

However, in order to manipulate the air conditioner using the buttons provided on the main body of the air conditioner as in the related art, it was inconvenient since a user needed to reach to the peripheral portion of the air conditioner, and in a case of using the remote controller for manipulating the air conditioner, it was also inconvenient since the user needed to find the remote controller.

In addition, the air conditioner in the related art was operated at a temperature with a wind strength in a cooling mode directly set by the user without considering a cooling tendency of the user, which leaded a deterioration in usability for the user.

DISCLOSURE

Technical Problem

The disclosure is made in view of the above-mentioned problems and an object of the disclosure is to control an air conditioner by obtaining a control command according to a user cooling tendency based on a user voice including a state of the user.

Technical Solution

In accordance with an aspect of the disclosure, there is provided a method for controlling an air conditioner, the method including: obtaining a user voice including a state of a user; transmitting the user voice to an external server; receiving a control command obtained using a cooling tendency of the user determined based on a usage history of the air conditioner and the state of the user from the external server; and controlling the air conditioner based on the control command.

The control method may further include, based on a user command for controlling the air conditioner being obtained before transmitting the user voice to the external server, transmitting information regarding the user command, sensing data detected by the air conditioner, and information regarding weather of an area where the air conditioner is located to the external server, and the cooling tendency of the user may be determined every preset cycle based on the information regarding the user command, the sensing data detected by the air conditioner, and the information regarding the weather of the area where the air conditioner is located which are transmitted to the external server.

The cooling tendency of the user may be a cooling tendency corresponding to the usage history of the air conditioner among a plurality of cooling tendencies, and the plurality of cooling tendencies may include a rapid normal cooling tendency, a power-saving normal cooling tendency, a rapid windless cooling tendency, and a power-saving normal cooling tendency determined with a combination of a cooling mode, a wind strength, and a preference temperature set by the user.

The transmitting may include transmitting sensing data detected by the air conditioner and identification information of the air conditioner to the external server together with the user voice.

The control command may include information regarding a set temperature, a cooling mode, and a wind strength of the air conditioner determined based on the cooling tendency of the user, the user voice, the sensing data detected by the air conditioner, and the information regarding the weather of the area where the air conditioner is located.

The control command may be obtained by inputting the user voice to an artificial intelligence model trained based on the cooling tendency of the user.

The receiving may include receiving the control command together with information regarding a voice message corresponding to the control command from the external server, the controlling may include controlling the air conditioner according to the control command, and the control method may further include outputting a voice message corresponding to the control command.

The control method may further include: detecting a user of the air conditioner, and the transmitting may include transmitting information regarding the detected user to the external server together with the user voice.

In accordance with another aspect of the disclosure for achieving the above object, there is provided an air conditioner including: a communicator; a cooler; a memory storing at least one instruction; and a processor configured to be electrically connected to the communicator, the cooler, and the memory and control the air conditioner, and the processor, by executing the at least one instruction, may be configured to: based on a user voice including a state of a user being obtained, control the communicator to transmit the user voice to an external server; receive a control command obtained using a cooling tendency of the user determined based on a usage history of the air conditioner and the state of the user from the external server via the communicator; and control the cooler based on the control command.

The processor may be configured to, based on a user command for controlling the air conditioner being obtained before transmitting the user voice to the external server, control the communicator to transmit information regarding the user command, sensing data detected by the air conditioner, and information regarding weather of an area where the air conditioner is located to the external server, and the cooling tendency of the user may be determined every preset cycle based on the information regarding the user command, the sensing data detected by the air conditioner, and the information regarding the weather of the area where the air conditioner is located which are transmitted to the external server.

The cooling tendency of the user may be a cooling tendency corresponding to the usage history of the air conditioner among a plurality of cooling tendencies, and the plurality of cooling tendencies include a rapid normal cooling tendency, a power-saving normal cooling tendency, a rapid windless cooling tendency, and a power-saving normal cooling tendency determined with a combination of a cooling mode, a wind strength, and a preference temperature set by the user.

The air conditioner may further include: a sensor configured to detect a state of an area where the air conditioner is located, and the processor may be configured to control the communicator to transmit sensing data detected by the sensor and identification information of the air conditioner to the external server together with the user voice.

The control command may include information regarding a set temperature, a cooling mode, and a wind strength of the air conditioner determined based on the cooling tendency of the user, the user voice, the sensing data detected by the air conditioner, and the information regarding the weather of the area where the air conditioner is located.

The control command may be obtained by inputting the user voice to an artificial intelligence model trained based on the cooling tendency of the user.

The air conditioner may further include: an output unit configured to output a voice message, and the processor may be configured to receive the control command together with information regarding a voice message corresponding to the control command from the external server, control the air conditioner according to the control command, and control the output unit to output a voice message corresponding to the control command.

The processor may be configured to, based on the user of the air conditioner being detected, transmit information regarding the detected user to the external server together with the user voice.

In accordance with a still another aspect of the disclosure, there is provided a method for controlling an external server, the method including: receiving a user voice including a state of a user from an air conditioner; obtaining a control command for controlling the air conditioner based on a cooling tendency of the user determined based on a usage history of the air conditioner and the state of the user; and transmitting the obtained control command to the air conditioner.

The control method may further include: receiving information regarding a user command, sensing data detected by the air conditioner, and information regarding weather of an area where the air conditioner is located from the air conditioner before transmitting the user voice to the external server; and determining the cooling tendency of the user based on the information regarding the user command, the sensing data detected by the air conditioner, and the information regarding the weather of the area where the air conditioner is located every preset cycle.

The cooling tendency of the user may be a cooling tendency corresponding to the usage history of the air conditioner among a plurality of cooling tendencies, and the plurality of cooling tendencies include a rapid normal cooling tendency, a power-saving normal cooling tendency, a rapid windless cooling tendency, and a power-saving normal cooling tendency determined with a combination of a cooling mode, a wind strength, and a preference temperature set by the user.

The obtaining may include obtaining the control command by inputting the user voice to an artificial intelligence model trained based on the cooling tendency of the user.

Effect of Invention

According to the various embodiments of the disclosure described above, the user may control the air conditioner through the user voice without a separate manipulating device and an indoor environment optimized for the user may be provided by controlling the air conditioner according to the cooling tendency of the user.

DESCRIPTION OF DRAWINGS

FIGS. 6 and 7 are diagrams for illustrating a method for obtaining a control command based on the user cooling tendency and the user voice according to an embodiment;

FIG. 8 is a sequence diagram for illustrating an embodiment of obtaining a control command using an artificial intelligence model trained based on the user cooling tendency according to another embodiment;

DETAILED DESCRIPTION OF EXEMPLARY EMBODIMENTS

Figure 1:
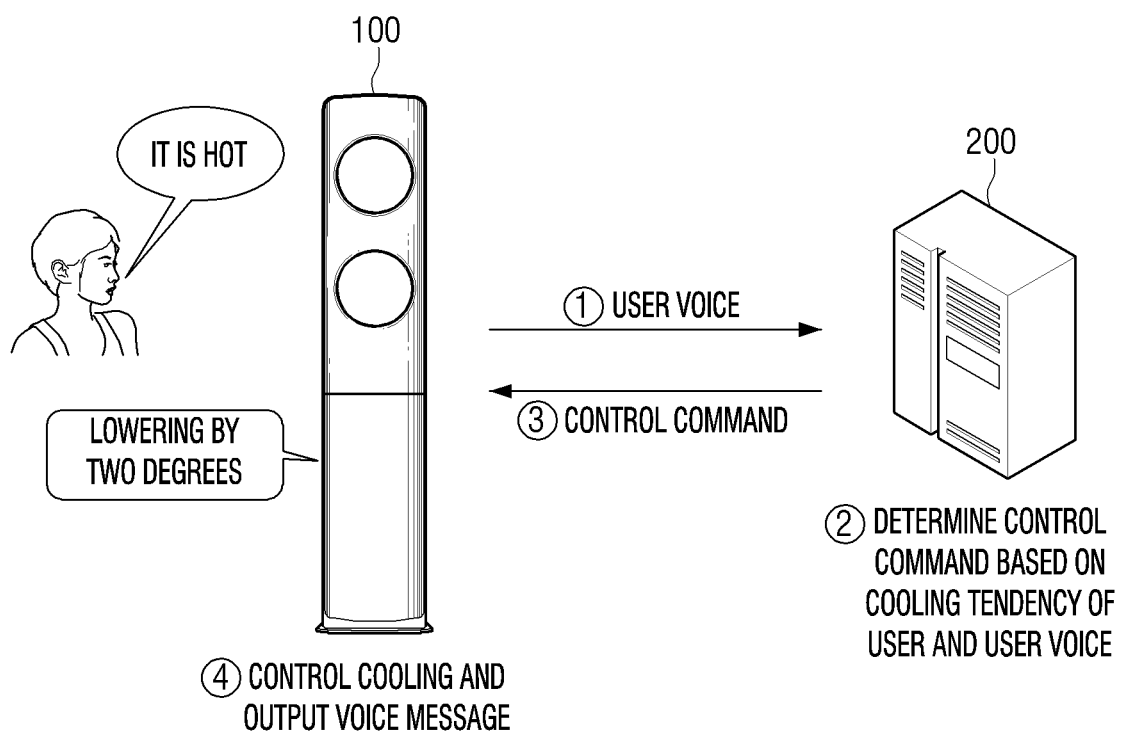
FIG. 1 is a diagram illustrating usage of an air conditioner for controlling the air conditioner according to a cooling tendency of a user using a user voice according to an embodiment.

Hereinafter, various embodiments of the disclosure will be described with reference to the accompanying drawings. However, it should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

An air conditioner according to various embodiments of the disclosure may refer to a device performing operations such as cooling, heating, purification, and the like of the air and may include, for example, at least one of a residential air conditioner, an air conditioner, a ceiling-mounted air conditioner, a car air conditioner, a dehumidifier, a cold air blower, and an air purifier. In this disclosure, a term "user" may refer to a person using the air conditioner or an apparatus (e.g., an artificial intelligence electronic apparatus) using the air conditioner.

FIG. 1 is a diagram illustrating usage of an air conditioner for controlling the air conditioner according to a cooling tendency of a user using a user voice according to an embodiment.

First, when an event of receiving a user command for manipulating an air conditioner 100 occurs, the air conditioner 100 may transmit information regarding the event to an external server 200. The information regarding the event may include at least one of information regarding a user command, information regarding the air conditioner 100, and sensing data sensed by the air conditioner 100. In addition, the information regarding the event may further include information regarding a detected user, information regarding weather of an area where the air conditioner 100 is located, and the like.

Further, in addition to the event of receiving the user command, the air conditioner 100 may also transmit the information regarding the event, even in a case where other events (e.g., an event that the user is detected by the air conditioner 100, an event that the user manipulates another electronic device connected to the air conditioner 100, and the like) occur.

When the user command is input, the air conditioner 100 may store information regarding the user command and transmit the information regarding the event including the information regarding the user command to the external server 200 every preset cycle.

The external server 200 may store the information regarding the event received from the air conditioner 100. The external server 200 may determine the cooling tendency of the user based on pieces of the information regarding the event (in other words, usage history of the air conditioner 100) received from the air conditioner 100 and stored.

Specifically, the external server 200 may analyze the cooling tendency of the user based on the information regarding the user command received from the air conditioner 100, sensing data detected by the air conditioner, and information regarding the weather of the area where the air conditioner is located every preset cycle (e.g., 1 day).

The external server 200 may determine a cooling tendency corresponding to the usage history of the air conditioner 100 among a plurality of cooling tendencies. The plurality of cooling tendencies may be determined with a combination of a cooling mode, a wind strength, and a preference temperature (temperature frequently set by the user) set by the user, and may include, for example, a rapid normal cooling tendency (or low-temperature and high-speed cooling tendency), a power-saving normal cooling tendency (or high-temperature and high-speed cooling tendency), a rapid windless cooling tendency (or low-temperature and low-speed cooling tendency), and a power-saving windless cooling tendency (or high-temperature and low-speed cooling tendency).

The external server 200 may match the air conditioner 100 to the cooling tendencies of the user and store these and transmit the cooling tendencies of the user to the air conditioner 100. In addition, the external server 200 may analyze and store the cooling tendency for each user.

The air conditioner 100 may obtain a user voice including a user state. The user state may refer to a state of the user currently feeling about the weather such as a temperature and a humidity, and may include, for example, a user state such as "it is hot", as illustrated in FIG. 1. However, this is merely an embodiment and the user state may include various states such as "it is cold", "it is very hot", "it is very cold", "it is humid", "it is dry", and the like.

In addition, the air conditioner 100 may obtain the user voice including the user state, but this is merely an embodiment and the air conditioner 100 may obtain various user commands indicating the user state. For example, the air conditioner 100 may obtain various user commands such as a touch input, a motion of the user, a button input of the user, and the like.

The air conditioner 100 may transmit the obtained user voice to the external server 200. The air conditioner 100 may transmit the obtained user voice to an STT server to obtain text information corresponding to the user voice, and then transmit the text information to the external server 200.

In addition, the air conditioner 100 may transmit the information regarding the air conditioner 100 and the sensing data sensed by the air conditioner 100, in addition to the user voice, to the external server 200.

The external server 200 may receive the user voice and the sensing data sensed by the air conditioner 100 from the air conditioner 100. In addition, the external server 200 may also receive information regarding the weather of the area where the air conditioner 100 is located via the air conditioner 100 or a smart home service server.

The external server 200 may determine a control command for controlling the air conditioner 100 based on the cooling tendencies of the user determined based on the user history of the air conditioner 100 and the state of the user included in the user voice. Specifically, the external server 200 may store control commands determined based on the plurality of cooling tendencies and the user state and the external server 200 may obtain the control command corresponding to the cooling tendencies of the user and the state of the user among the stored control commands. In addition, the external server 200 may obtain the control command based on the sensing data currently obtained by the air conditioner 100.

The external server 200 may obtain information regarding a voice message corresponding to the control command together with the control command. For example, if the control command is a "control command for lowering a room temperature by 2 degrees", the external server 200 may obtain information regarding a voice message of "lowering by 2 degrees" as a voice message corresponding to the control command. The obtaining the information regarding the voice message as a message indicating the control command by the external server 200 is merely an embodiment, and the external server 200 may obtain information regarding various types of messages (e.g., a text message, a vibration message, and the like).

The external server 200 may transmit the control command to the air conditioner 100. The external server 200 may transmit the voice message together with the control command to the air conditioner 100.

The air conditioner 100 may perform a cooling operation according to the received control command and output a voice message. For example, the air conditioner 100 may operate according to the control command for lowering the temperature by 2 degrees from the detected temperature and output a voice message of "lowering by 2 degrees".

As described above, the air conditioner 100 may perform the operation corresponding to the user state according to the cooling tendencies of the user to provide a cooling service optimized to the user.

Meanwhile, according to another embodiment of the disclosure, the air conditioner 100 may obtain a control command using an artificial intelligence model trained based on a history of usage of the air conditioner 100 by the user.

Specifically, when the user command is input, the air conditioner 100 may transmit the information regarding the user command and the sensing data detected by the air conditioner 100 to the external server 200. The external server 200 may train an artificial intelligence model based on the information regarding the user command and the sensing data detected by the air conditioner 100. In other words, the artificial intelligence model may be trained based on the usage history of the air conditioner 100 of the user.

When the user voice including the user state is received, the air conditioner 100 may transmit the received user voice to the external server 200. Then, the air conditioner 100 may obtain the control command for controlling the air conditioner 100 by inputting the user state to the trained artificial intelligence model.

The external server 200 may transmit the obtained control command to the air conditioner 100 and the air conditioner 100 may perform the cooling operation based on the received control command.

The artificial intelligence model mentioned in the above embodiment may refer to an artificial intelligence model trained based on an artificial intelligence algorithm and may be, for example, a model based on a neural network. The trained artificial intelligence model may be designed to simulate a brain structure of human on the computer and may include a plurality of network nodes including weights and simulating neurons of the neural network of human. The plurality of network nodes may form connections to each other to simulate a synaptic activity in that the neurons transmit and receive signals through synapse. In addition, the trained artificial intelligence model may include, for example, a neural network model or a deep learning model developed from the neural network model. In a deep learning model, a plurality of network nodes may be positioned at depths (or on layers) different from each other and may transmit and receive data according to the convolution connection. Examples of the trained artificial intelligence model may include a deep neural network (DNN), a recurrent neural network (RNN), and a bidirectional recurrent deep neural network (BRDNN), but there is no limitation thereto.

In order to obtain the control command according to the cooling tendencies of the user, an artificial intelligence dedicated program (or artificial intelligence agent) may use a personal assistant program. The personal assistant program may refer to a dedicated program for providing a service based on artificial intelligence (AI) and may be executed by a general-purpose processor of the related art (e.g., CPU) or a separate AI dedicated processor (e.g., GPU).

In the embodiment described above, it is described that the air conditioner 100 is operated in association with the external server 200, but this is merely an embodiment, and the air conditioner 100 may analyze and store the cooling tendencies of the user by itself or store the artificial intelligence model according to the cooling tendencies of the user.

Figure 2A:
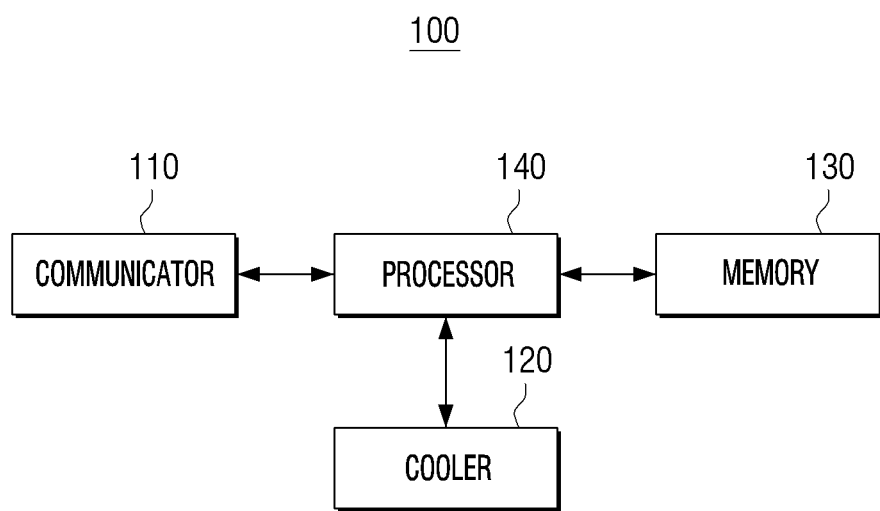
FIG. 2A is a block diagram schematically illustrating a configuration of the air conditioner according to an embodiment.

FIG. 2A is a block diagram schematically illustrating a configuration of the air conditioner 100 according to an embodiment. Referring to FIG. 2A, the air conditioner 100 may include a communicator 110, a cooler 120, a memory 130, and a processor 140. The configuration illustrated in FIG. 2A is an example for implementing the embodiment of the disclosure and suitable hardware/software configuration apparent to those skilled in the art may be additionally included to the air conditioner 100 or the configuration illustrated in FIG. 2A may be omitted.

The communicator 110 may communicate with other external devices using various communication methods. Particularly, the communicator 110 may transmit the information regarding the event including the information regarding the user command and the user voice including the user state to the external server 200. In addition, the communicator 110 may receive a control command determined based on the cooling tendencies of the user from the external server 200. Further, the communicator 110 may communicate with an external electronic device or a remote controller. The communicator 110 may receive a user voice or a user command via the remote controller and the like.

Particularly, the communicator 110 may communicate with various types of external devices according to various types of the communication methods. The communicator 110 may include at least one of a Wi-Fi chip, a Bluetooth chip, a wireless communication chip, an IR chip, and a Zigbee chip. The processor 130 may communicate with an external device or various other external devices by using the communicator 110. In addition, the communicator 110 may communicate with the external server 200 via various communication chips such as the Wi-Fi chip and the like.

The cooler 120 may perform a cooling operation of the air conditioner 100. The cooler 120 may perform the cooling operation according to the user command input via the remote controller or a button provided on the air conditioner 100. In addition, the cooler 120 may perform the cooling operation according to the user voice input from a microphone included in the air conditioner 100 or a microphone included in a device connected to the air conditioner 100.

The cooler 120 may perform the cooling operation based on a temperature, a wind strength, a cooling mode, and a humid state set according to the user command or the user voice. In addition, the cooler 120 may also include an outside unit, not only an indoor unit of the air conditioner 100.

The memory 130 may store an instruction or data related to at least one of other elements of the air conditioner 100. Particularly, the memory 130 may be implemented as a non-volatile memory, a volatile memory, a flash memory, a hard disk drive (HDD), or a solid state drive (SSD). The memory 130 may be accessed by the processor 140 and reading, recording, editing, deleting, or updating of the data by the processor 140 may be executed. A term, memory, in the disclosure may include the memory 130, a ROM (not illustrated) and RAM (not illustrated) in the processor 140, or a memory card (not illustrated) (e.g., micro SD card or memory stick) mounted on the air conditioner 100.

Particularly, the memory 130 may store the artificial intelligence dedicated program. The artificial intelligence dedicated program may refer to a program personalized to provide various services regarding the air conditioner 100.

The processor 140 may be electrically connected to the communicator 110, the cooler 120, and the memory 130 to control general operations and functions of the air conditioner 100. Particularly, the processor 140 may obtain a control command corresponding to a user tendency using various programs (or instructions) stored in the memory 130 and control the air conditioner 100 to perform the cooling operation according to the obtained control command.

Specifically, when the user voice including the state of the user is obtained, the processor 140 may control the communicator 110 to transmit the user voice to the external server 200. The processor 140 may receive the control command obtained by using the cooling tendency of the user determined based on the usage history of the air conditioner 100 and the state of the user from the external server 200 via the communicator 110. The processor 140 may control the cooler 120 based on the control command.

Particularly, when the user command for controlling the air conditioner 100 is obtained before transmitting the user voice to the external server 200, the processor 140 may control the communicator 110 to transmit the information regarding the user command, the sensing data detected by the air conditioner 100, and the information regarding the weather of the area where the air conditioner 100 is located to the external server 200. In other words, the processor 140 may transmit information regarding the usage history of the air conditioner 100 used to determine the cooling tendencies of the user by the external server 200 to the external server 200.

The cooling tendency of the user may be determined based on the information regarding the user command transmitted to the external server 200, the sensing data detected by the air conditioner 100, and the information regarding the weather of the area where the air conditioner is located every preset cycle.

In addition, the cooling tendency of the user may refer to a cooling tendency corresponding to the usage history of the air conditioner among the plurality of cooling tendencies, and the plurality of cooling tendencies may be determined with a combination of the cooling mode, the wind strength, and the preference temperature set by the user. For example, the plurality of cooling tendencies may include a rapid normal cooling tendency, a power-saving normal cooling tendency, a rapid windless cooling tendency, and a power-saving windless cooling tendency.

In addition, the processor 140 may control the communicator 110 to transmit the sensing data detected by the air conditioner 100 and identification information of the air conditioner 100 together with the user voice to the external server 200.

Further, the processor 140 may receive the control command corresponding to the cooling tendency of the user from the external server 200 via the communicator 110. The control command may include information regarding a set temperature, a cooling mode, and a wind strength of the air conditioner determined based on the cooling tendency of the user, the user voice, the sensing data detected by the air conditioner 100, and the information regarding the weather of the area where the air conditioner is located. According to another embodiment of the disclosure, the control command may be obtained by inputting the user voice to the artificial intelligence model trained based on the cooling tendency of the user.

In addition, the processor 140 may receive the control command and the information regarding the voice message corresponding to the control command from the external server via the communicator 110. The processor 140 may control the cooler 130 according to the control command and output the voice message corresponding to the control command.

Figure 2B:
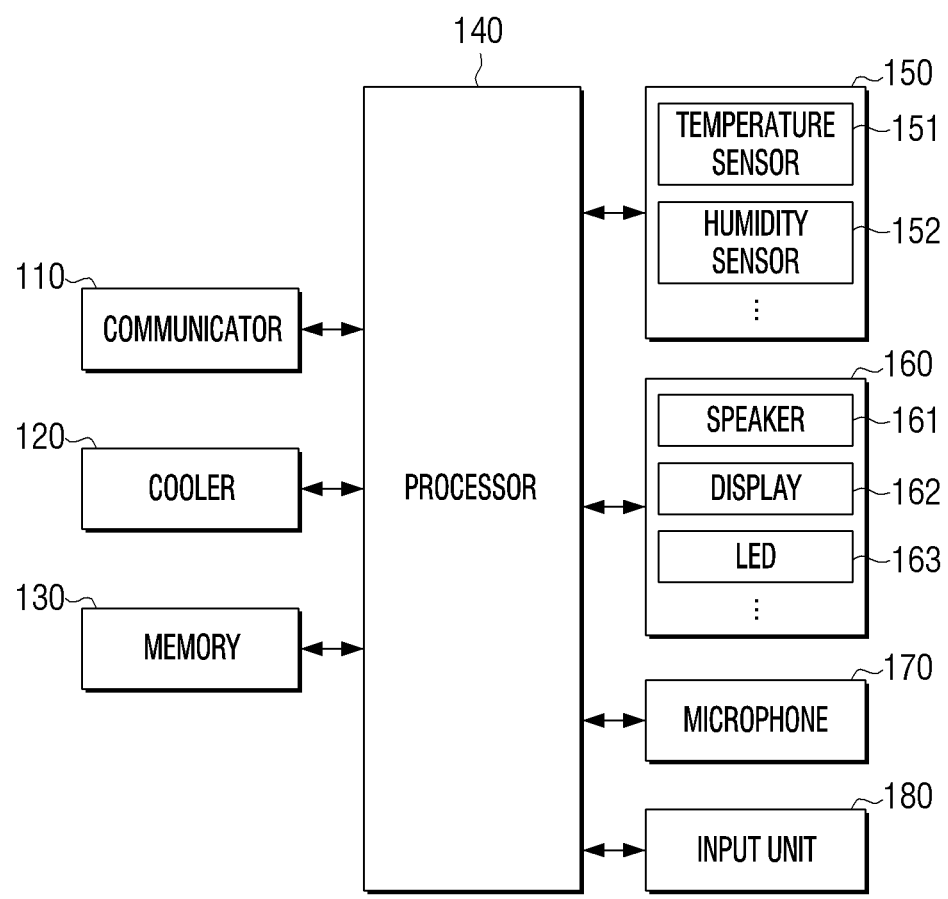
FIG. 2B is a block diagram specifically illustrating the configuration of the air conditioner according to an embodiment.

FIG. 2B is a block diagram specifically illustrating the configuration of the air conditioner according to an embodiment. Referring to FIG. 2B, the air conditioner 100 may include the communicator 110, the cooler 120, the memory 130, a sensor 150, an output unit 160, a microphone 170, an input unit 180, and the processor 140. Meanwhile, the communicator 110, the cooler 120, the memory 130, and the processor 140 have been described in FIG. 2A, and therefore the overlapped description will not be repeated.

The sensor 150 may obtain various pieces of information of the area where the air conditioner 100 is located. Referring to FIG. 2B, the sensor 150 may include a temperature sensor 151, a humidity sensor 152, and the like, but this is merely an embodiment, and the sensor 150 may also include various sensors (e.g., an IR sensor, a proximity sensor, a camera, and the like for detecting presence of the user).

The output unit 160 may output a message provided by the air conditioner 100. Referring to FIG. 2B, the output unit 160 may include a speaker 161 for providing a voice message, a display 162 and an LED 163 for providing a visual message, and the like, but there is no limitation thereto.

The microphone 170 may be provided in the air conditioner 100 as an element for obtaining the user voice, but this is merely an embodiment, and the microphone 170 may be provided outside of the air conditioner 100 and electrically connected to the air conditioner 100.

The input unit 180 may receive the user command and transmit the user command to the processor 140. The input unit 180 may include a touch sensor, a (digital) pen sensor, a pressure sensor, a key, and the like. The touch sensor may use, for example, at least one type of an electrostatic type, a pressure-sensitive type, an infrared type, or an ultrasonic type. The (digital) pen sensor may be, for example, a part of a touch panel or may include a separate sheet for recognition. The key may include, for example, a physical button, an optical key, or a keypad.

Figure 3A:
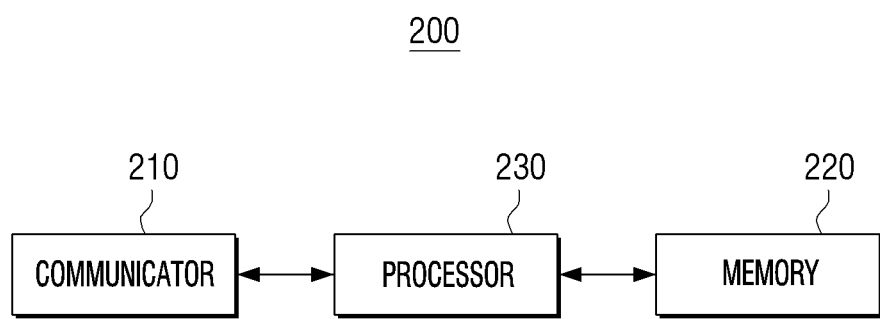
FIG. 3A is a block diagram illustrating a configuration of an external server according to an embodiment.

FIG. 3A is a block diagram illustrating a configuration of the external server according to an embodiment. Referring to FIG. 3A, the external server 200 may include a communicator 210, a memory 220, and a processor 230. The configuration illustrated in FIG. 3A is an example for implementing the embodiments of the disclosure and suitable hardware/software configuration apparent to those skilled in the art may be additionally included to the external server 200 or the configuration illustrated in FIG. 3A may be omitted. Meanwhile, according to an embodiment of the disclosure, the external server 200 may be implemented as a server implemented outside, but this is merely an embodiment, and the external server 200 may be implemented as one of electronic devices provided at home (e.g., home gateway, TV, and the like).

The communicator 210 may communicate with the air conditioner 100. Particularly, the communicator 210 may receive information regarding the event including the information regarding the user command (or usage history information of the air conditioner) from the air conditioner 100 and receive the information regarding the user voice including the user state. In addition, the communicator 210 may transmit the control command determined according to the cooling tendency of the user to the air conditioner 100. Particularly, the communicator 210 may communicate with various types of air conditioner 100 according to various types of the communication methods. The communicator 210 may include at least one of a Wi-Fi chip, a Bluetooth chip, and a wireless communication chip.

The memory 220 may store an instruction or data related to at least one of other elements of the external server 200. Particularly, the memory 220 may be implemented as a non-volatile memory, a volatile memory, a flash memory, a hard disk drive (HDD), or a solid state drive (SSD). The memory 220 may be accessed by the processor 230 and reading, recording, editing, deleting, or updating of the data by the processor 230 may be executed. A term, memory, in the disclosure may include the memory 220, a ROM (not illustrated) and RAM (not illustrated) in the processor 230, or a memory card (not illustrated) (e.g., micro SD card or memory stick) mounted on the external server 200.

Particularly, the memory 220 may store the cooling tendencies corresponding to the air conditioner (or user). In addition, the memory 220 may store a matching table including a control command matched to the cooling tendency and the user state. In addition, the memory 220 may store an artificial intelligence model. The artificial intelligence model may refer to a model trained based on the usage history of the air conditioner 100 and may obtain the control command for controlling the air conditioner 100 by inputting the information regarding the user state to the artificial intelligence model.

Figure 3B:
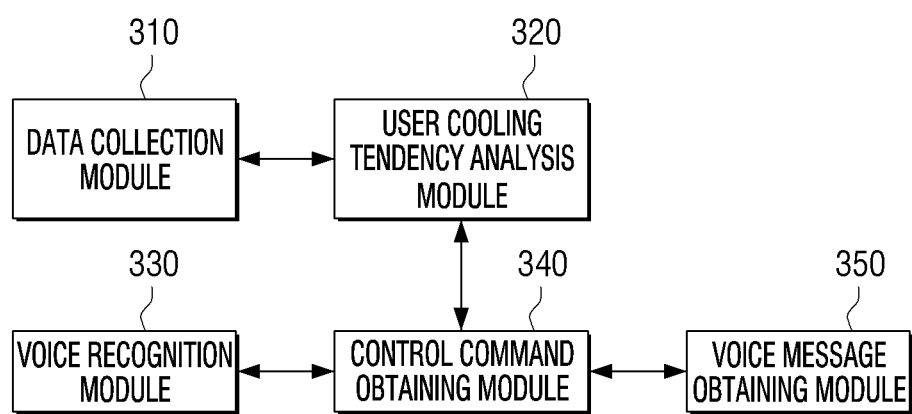
FIG. 3B is a block diagram including modules for providing a control command according to the cooling tendency of the user by analyzing the cooling tendency of the user according to an embodiment.

The memory 220 may include various modules for providing control command according to the cooling tendency of the user by analyzing the cooling tendency of the user illustrated in FIG. 3B.

The processor 230 (or controller) may control general operations of the external server 200 using various programs stored in the memory 220. Specifically, the processor 230 may obtain the cooling tendency of the user using the air conditioner 100 by receiving the information regarding the user command, the sensing data detected by the air conditioner 100, and the information regarding the weather of the area where the air conditioner 100 is located which are received from the air conditioner 100. In other words, the processor 230 may determine the cooling tendency of the user based on the usage history of the air conditioner 100. The processor 230 may determine the cooling tendency of the user based on the usage history of the air conditioner 100 every preset cycle (e.g., 1 day).

The processor 230 may determine the cooling tendency corresponding to the usage history of the air conditioner 100 among the plurality of cooling tendencies. Particularly, the plurality of cooling tendencies may include a rapid normal cooling tendency, a power-saving normal cooling tendency, a rapid windless cooling tendency, and a power-saving windless cooling tendency.

The processor 230 may match the information regarding the air conditioner 100 to the cooling tendency corresponding to the air conditioner 100 and store these.

Then, the processor 230 may receive the user voice including the user state from the air conditioner 100 via the communicator 210.

The processor 230 may obtain the control command for controlling the air conditioner 100 based on the cooling tendency of the user determined based on the usage history of the air conditioner 100 and the state of the user. In an embodiment, the processor 230 may obtain the control command for the user voice by using the matching table in which the control command is matched to the cooling tendency and the user state and stored. In another embodiment, the processor 230 may obtain the control command by inputting the user voice to the artificial intelligence model trained based on the cooling tendency of the user.

The processor 230 may control the communicator 210 to transmit the obtained control command to the air conditioner 100.

FIG. 3B is a block diagram including modules for providing a control command according to the cooling tendency of the user by analyzing the cooling tendency of the user according to an embodiment. Referring to FIG. 3B, the external server 200 may include a data collection module 310, a user cooling tendency analysis module 320, a voice recognition module 330, a control command obtaining module 340, and a voice message obtaining module 350.

The data collection module 310 may collect data received from the air conditioner 100. The data collection module 310 may obtain the information regarding the event received from the air conditioner 100. The information regarding the event may include the information regarding the user command (e.g., preference temperature set by the user, the wind strength set by the user, the mode set by the user, and the like), the sensing data detected by the air conditioner 100, the information regarding the weather of the area where the air conditioner 100 is located, and the like.

The data collection module 310 may collect data based on the air conditioner 100, but this is merely an embodiment, and the data collection module 310 may collect data based on the user of the air conditioner 100.

The user cooling tendency analysis module 320 may analyze the cooling tendency of the user based on the data (that is, the usage history of the air conditioner 100) collected by the data collection module 310.

The cooling tendency of the user may be one of the plurality of cooling tendencies. The plurality of cooling tendencies may be classified with a combination of the cooling mode, the wind strength, and the preference temperature set by the user.

Specifically, the user cooling tendency analysis module 320 may determine a cooling strength based on the cooling mode, the wind strength, and the like set by the user. The cooling strength may refer to a cooling performance of the air conditioner 100. In the cooling mode (e.g., rapid cooling mode) which needs strong cooling performance or as the strength of the wind is strong, the cooling strength may increase, and in the cooling mode (e.g., power-saving cooling mode) which needs weak cooling performance or as the strength of the wind is weak, the cooling strength may be reduced. In addition, the cooling strength may relate to power consumption of the air conditioner 100. The user cooling tendency analysis module 320 may determine one of the plurality of cooling tendencies based on the determined cooling strength and the preference temperature preferred by the user. The plurality of cooling tendencies may include the rapid normal cooling tendency, the rapid windless cooling tendency, the power-saving normal cooling tendency, and the power-saving windless cooling tendency.

The voice recognition module 330 may convert the user voice received from the air conditioner 100 into a text. In addition, the voice recognition module 330 may perform a natural language processing operation and a natural language understanding operation regarding the received user voice.

The control command obtaining module 340 may obtain the control command of the user voice based on the cooling tendency of the user analyzed via the user cooling tendency analysis module 340. Specifically, the control command obtaining module 340 may store a matching table in which the control command is matched to the user cooling tendency and the user state included in the user voice and stored. The control command obtaining module 340 may obtain the control command corresponding to the user state included in the user voice and the user cooling tendency by using the matching table.

The voice message obtaining module 350 may obtain a voice message corresponding to the obtained control command. The voice message may refer to a voice message to be output by the air conditioner 100 and may include information regarding the control command (e.g., set temperature, wind strength, cooling mode, and the like).

Meanwhile, in the above embodiment, it is described that one external server 200 is implemented, but this is merely an embodiment, and a plurality of external servers 200 may be implemented. For example, the voice recognition module 330 may be implemented as a separate server and the data collection module 310 may also be implemented as a separate server.

Hereinafter, referring to FIGS. 4 to 7, an embodiment in which the air conditioner 100 and the external server 200 provide the control command corresponding to the user voice by determining the user cooling tendency will be described in detail.

Figure 4:
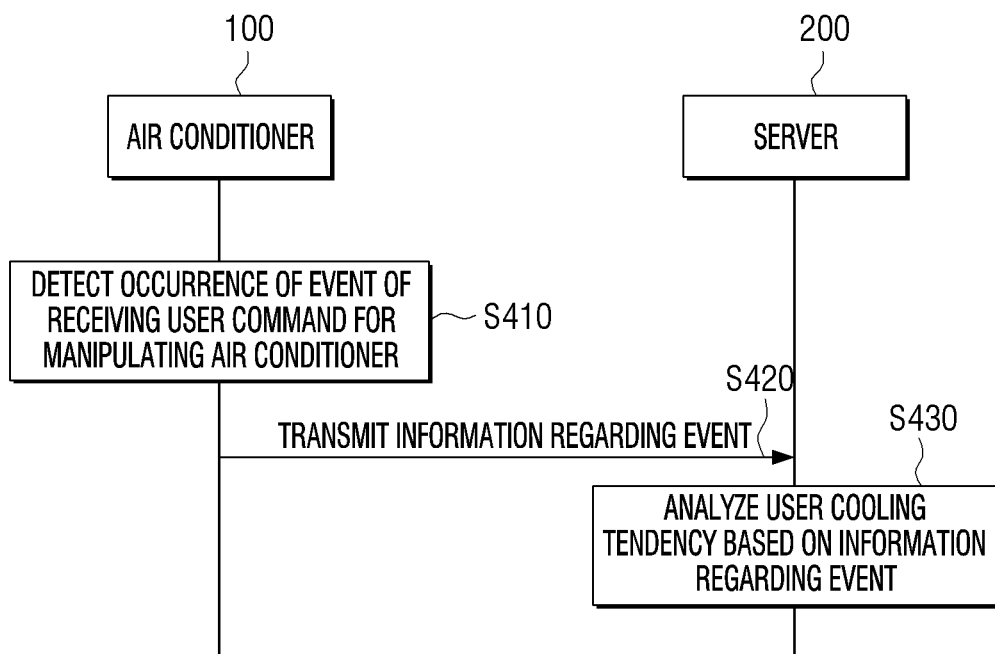
FIGS. 4 and 5 are diagrams for illustrating a method for determining the user cooling tendency according to an embodiment.
Figure 5:
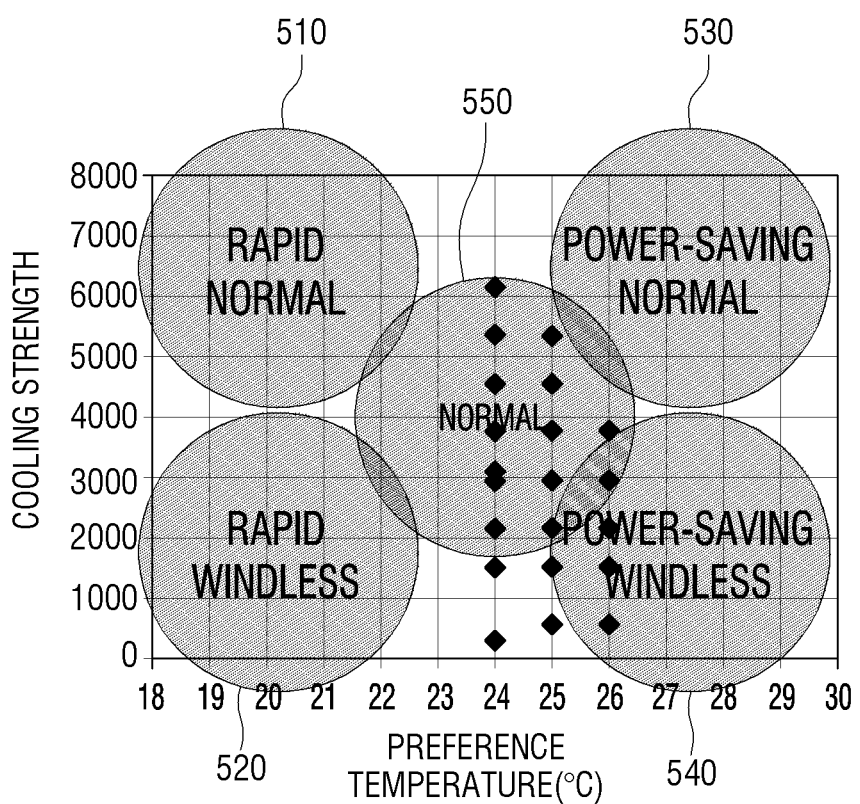

FIGS. 4 and 5 are diagrams for illustrating a method for determining the user cooling tendency according to an embodiment.

First, the air conditioner 100 may detect occurrence of an event of receiving a user command for manipulating the air conditioner 100 (S410). For example, when the user inputs a user command for setting the preference temperature, the wind strength, the cooling mode, sleep mode setting, and the like of the air conditioner 100, the air conditioner 100 may detect the occurrence of the event of receiving the user command.

In addition, the air conditioner 100 may detect the sensing data within a predetermine period of time from the point when the event occurrence is detected.

Further, the air conditioner 100 may detect a user who has input the user command among a plurality of users in a house. At this time, the air conditioner 100 may detect the user by analyzing an image captured by a camera included in the air conditioner 100 or an electronic device electrically connected to the air conditioner 100, and may detect the user who has input the user command through various pieces of information such as the voice uttered by the user, identification information input by the user, and the like.

The air conditioner 100 may transmit information regarding the event to the server 200 (S420). The information regarding the event may refer to information regarding the usage history of the air conditioner 100 and may include the information regarding the user command (e.g., information regarding the preference temperature, the wind strength, the cooling mode, and the like set by the user), the sensing data detected by the air conditioner 100 (e.g., temperature data, humidity data, and the like), and the like. According to still another embodiment, the information regarding the event may include identification information of the air conditioner 100 (e.g., model name, product number, manufacturer, MAC address, and the like of the air conditioner 100). The information regarding the event may further include information regarding the user who detected by the air conditioner 100. The information regarding the event may further include the information regarding the weather of the area where the air conditioner 100 is located.

The server 200 may analyze the user cooling tendency based on the information regarding the event (S430).

Specifically, the server 200 may analyze the user cooling tendency based on the information regarding the event received from the air conditioner 100. The cooling tendency of the user may be updated every preset cycle (e.g., 1 day) and the user cooling tendency may be analyzed by applying weights to the pieces of information regarding the event received recently.

Particularly, the server 200 may determine the cooling strength based on the cooling mode, the wind strength, and the like set by the user included in the information regarding the event. The cooling strength may refer to cooling performance of the air conditioner 100 and may relate to the power consumption of the air conditioner 100. The user cooling tendency analysis module 320 may determine one of the plurality of cooling tendencies based on the determined cooling strength and the preference temperature preferred by the user.

The plurality of cooling tendencies may include the rapid normal cooling tendency, the rapid windless cooling tendency, the power-saving normal cooling tendency, and the power-saving windless cooling tendency. Specifically, referring to FIG. 5, if the user command for a low preference temperature of the user and a high cooling strength is frequently input, the server 200 may determine the cooling tendency of the user as a raid normal cooling tendency 510, if the user command for a low preference temperature of the user and a low cooling strength is frequently input, the server 200 may determine the cooling tendency of the user as a rapid windless cooling tendency 520, if the user command for a high preference temperature of the user and a high cooling strength is frequently input, the server 200 may determine the cooling tendency of the user as a power-saving normal cooling tendency 530, and if the user command for a high preference temperature of the user and a low cooling strength is frequently input, the server 200 may determine the cooling tendency of the user as a power-saving windless cooling tendency 540. In addition, if the preference temperature of the user and the cooling strength are approximately at the moderate level, the server 200 may determine the cooling tendency of the user as a normal cooling tendency 550.

The cooling strength and the preference temperature as criteria for dividing the plurality of cooling tendencies may be set by a manufacturer or a service provider, but this is merely an embodiment, and these may be set by the pieces of information received from the plurality of air conditioners.

The server 200 may match the cooling tendency of the user using the air conditioner 100 to the air conditioner 100 and store these. The server 200 may match the cooling tendency to the air conditioner 100 and store these, but this is merely an embodiment, and the server 200 may match the cooling tendency for each user using the air conditioner 100 and store these.

FIGS. 6 and 7 are diagrams for illustrating a method for obtaining a control command based on the user cooling tendency and the user voice according to an embodiment.

The air conditioner 100 may receive a user voice (S610). The user voice may include a text indicating the user state. For example, the user voice may include a state of the user currently feeling about the temperature such as "it is hot".

The air conditioner 100 may transmit the user voice and the sensing data to the server 200 (S620). Specifically, the air conditioner 100 may transmit, not only the user voice, but also the sensing data collected within the predetermined period of time based on a point when the user voice is input, to the air conditioner 100. In addition, the air conditioner 100 may detect a user who uttered the user voice, transmit the information regarding the detected user, and also transmit the data of the weather of the area where the air conditioner 100 is located.

The server 200 may determine the control command based on the user voice, the sensing data, the weather data, and the cooling tendency (S200). Specifically, the server 200 may store a matching table storing by matching the state of the user uttered by the user, the cooling tendency of the user, the current temperature state, the voice message, and the control command to each other. For example, referring to FIG. 7, the server 200 may match a user state 710 uttered by the user, a current temperature state 720, a user cooling tendency 730, a voice message 740, and a control command 750 to each other and store these.

In an example, when the user utters a voice including the user state such as "it is very hot", the server 200 may determine the control command for setting the cooling mode to the "rapid cooling mode", regardless of the set temperature, the preference temperature, and the cooling tendency of the user. In another example, when the user utters a voice such as "it is hot", the set temperature is higher than the preference temperature, and the cooling tendency of the user is the high-temperature and high-speed cooling, the server 200 may determine the control command for lowering the temperature by a "difference between the set temperature and the preference temperature" and increasing the wind strength. In still another example, when the user utters a voice such as "it is cold", the set temperature is higher than the preference temperature, and the user cooling tendency is the low-temperature and low-speed cooling, the server 200 may determine the control command for changing the cooling mode into the "windless mode". In still another example, when the user utters a voice such as "it is very cold", the server 200 may determine the control command for setting the cooling mode of the user to the "windless mode", regardless of the set temperature, the preference temperature, and the cooling tendency of the user.

The server 200 may obtain the voice message corresponding to the control command (S640). Specifically, the server 200 may obtain the voice message corresponding to the control command obtained by using the matching table as illustrated in FIG. 7. For example, when the user utters a voice including the user state such as "it is very hot", the server 200 may obtain a voice message such as "changing to a speed operation for rapid cooling" as the voice message corresponding to the control command.

The server 200 may transmit the obtained control command and the voice message to the air conditioner 100 (S650).

The air conditioner 100 may perform the cooling operation according to the control command (S660). For example, the air conditioner 100 may perform the cooling operation by controlling the cooler 120 based on the set temperature, the wind strength, the cooling mode and the like included in the control command.

The air conditioner 100 may output the voice message corresponding to the control command (S670). The output of the voice message to provide the information regarding the control command is merely an embodiment, and the voice message may be implemented as various types of voice messages (e.g., visual message, tactile message, and the like) corresponding to the control command.

Meanwhile, the matching table illustrated in FIG. 7 is merely an embodiment and may be implemented as a matching table in different forms. For example, the user state included in the voice uttered by the user is not simply limited to "it is very hot", "it is hot", "it is cold", and "it is very cold", but also include user state in various forms such as "it's hot", "it is so hot", "it is chilly", and the like. The server 200 (or air conditioner 100) may obtain the control command corresponding to the user state by processing the user voice through natural language understanding.

FIG. 8 is a sequence diagram for illustrating an embodiment of obtaining a control command using an artificial intelligence model trained based on the user cooling tendency according to another embodiment.

The air conditioner 100 may detect the event of receiving the user command for manipulating the air conditioner (S810). For example, when the user inputs the user command for setting the preference temperature, the wind strength, the cooling mode, the sleep mode setting, and the like of the air conditioner 100, the air conditioner 100 may detect the occurrence of the event of receiving the user command. In addition, the air conditioner 100 may detect the sensing data within the predetermined period of time from the point when the event occurrence is detected.

The air conditioner 100 may transmit the information regarding the event to the server 200 (S820). The information regarding the event may refer to information regarding the usage history of the air conditioner 100 by the user and may include the information regarding the user command (e.g., information regarding the preference temperature, the wind strength, the cooling mode, and the like set by the user), the sensing data detected by the air conditioner 100 (e.g., temperature data, humidity data, and the like), and the like.

The server 200 may train the artificial intelligence model based on the received information regarding the event (S830). The server 200 may train the artificial intelligence model so that the artificial intelligence model outputs the control command according to the cooling tendency of the user, by inputting the received information regarding the user included in the event to the artificial intelligence model.

The air conditioner 100 may obtain the user voice (S840). The user voice may include the text indicating the user state. For example, the user voice may include the state of the user feeling about the temperature such as "it is hot".

The air conditioner 100 may transmit the user voice to the server 200 (S850). The air conditioner 100 may transmit, not only the user voice, but also the sensing data collected within the predetermined period of time based on the point when the user voice is input, to the air conditioner 100.

The server 200 may obtain the control command by inputting the user voice to the artificial intelligence model (S860). Specifically, the server 200 may obtain the control command corresponding to the user state included in the user voice by inputting the user voice to the artificial intelligence model trained based on the cooling tendency of the user according to the usage history of the user.

The server 200 may transmit the obtained control command to the air conditioner 100 (S870). The server 200 may transmit the control command together with the voice message corresponding to the control command to the air conditioner 100.

The air conditioner 100 may perform the cooling operation according to the control command (S880). Specifically, the air conditioner 100 may perform the cooling operation by controlling the cooler 120 based on the set temperature, the wind strength, the cooling mode, and the like included in the control command. In addition, the air conditioner 100 may output the voice message while performing the cooling operation according to the control command.

Figure 9:
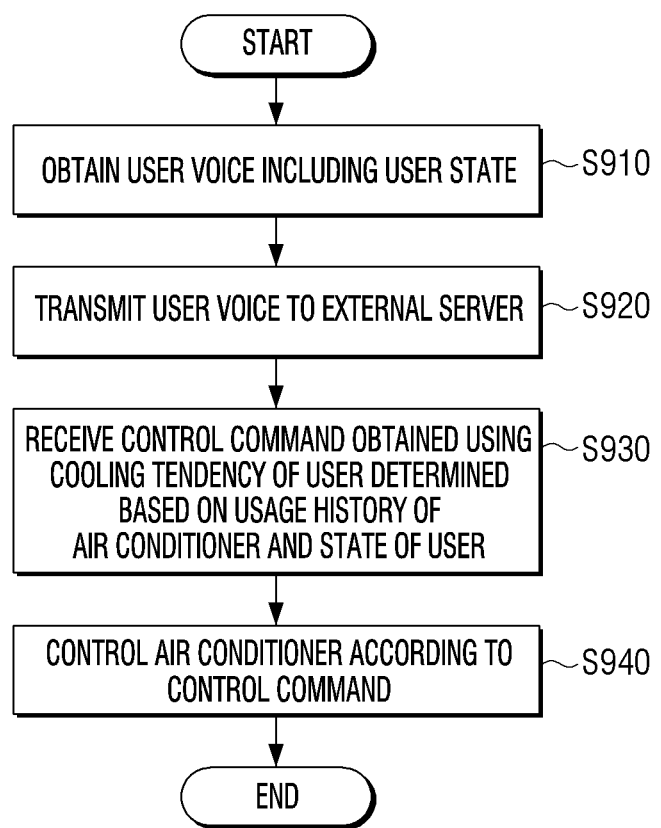
FIG. 9 is a flowchart for illustrating a method for controlling the air conditioner according to an embodiment.

FIG. 9 is a flowchart for illustrating a method for controlling the air conditioner according to an embodiment.

The air conditioner 100 may obtain the user voice including the user state (S910).

The air conditioner 100 may transmit the user voice to the external server 200 (S920). The air conditioner 100 may transmit the user voice together with the sensing data detected by the air conditioner 100.

The air conditioner 100 may receive the obtained control command by using the cooling tendency of the user determined based on the usage history of the air conditioner 100 and the user state (S930). The cooling tendency of the user may be determined every preset cycle based on the information regarding the user command for controlling the air conditioner 100, the sensing data detected by the air conditioner, and the information regarding the weather of the area where the air conditioner is located which are transmitted to the external server 200 before the user voice is transmitted to the external server 200.

The air conditioner 100 may control the air conditioner according to the control command (S940).

Figure 10:
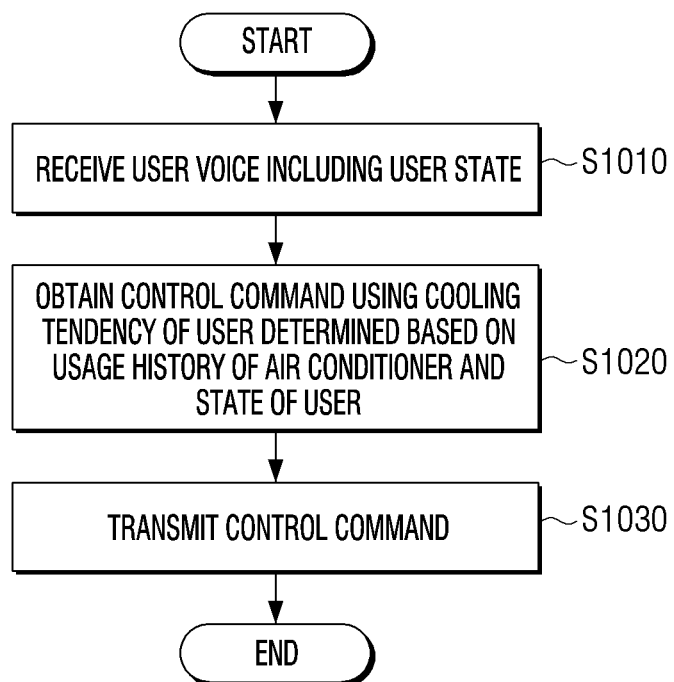
FIG. 10 is a flowchart for illustrating a method for controlling an external server according to an embodiment.

FIG. 10 is a flowchart for illustrating a method for controlling an external server according to an embodiment.

The external server 200 may receive the user voice including the user state (S1010).

The external server 200 may obtain the control command using the cooling tendency of the user determined based on the usage history of the air conditioner 100 and the user state (S1020). The external server 200 may determine the cooling tendency of the user as illustrated in FIGS. 4 and 5, and may determine the control command based on the determined cooling tendency of the user and the usage state as illustrated in FIGS. 6 and 7.

The external server 200 may transmit the control command to the air conditioner 100 (S1030).

According to various embodiments of the disclosure described above, the user may control the air conditioner through the user voice without a separate manipulating device and an indoor environment optimized for the user may be provided by controlling the air conditioner according to the cooling tendency of the user.

Various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., air conditioner 100) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments disclosed in this disclosure may be provided to be included in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

What is claimed is:

1. A method for controlling an air conditioner, the method comprising:
    obtaining a user voice including a state of a user;
    transmitting the user voice to an external server;
    receiving, from the external server, a control command obtained using a cooling tendency of the user determined based on a usage history of the air conditioner and the state of the user; and
    controlling the air conditioner based on the control command,
    wherein the transmitting comprises transmitting, to the external server, sensing data detected by the air conditioner and identification information of the air conditioner together with the user voice.

2. The control method of claim 1, further comprising:
    based on a user command for controlling the air conditioner being obtained before transmitting the user voice to the external server, transmitting, to the external server, information regarding the user command, the sensing data detected by the air conditioner, and information regarding weather of an area where the air conditioner is located,
    wherein the cooling tendency of the user is determined every preset cycle based on the information regarding the user command, the sensing data detected by the air conditioner, and the information regarding the weather of the area where the air conditioner is located which are transmitted to the external server.

3. The control method of claim 2,
wherein the cooling tendency of the user is a cooling tendency corresponding to the usage history of the air conditioner among a plurality of cooling tendencies, and
wherein the plurality of cooling tendencies include a rapid normal cooling tendency, a power-saving normal cooling tendency, a rapid windless cooling tendency, and a power-saving normal cooling tendency determined with a combination of a cooling mode, a wind strength, and a preference temperature set by the user.

4. The control method of claim 3, wherein the control command comprises information regarding a set temperature, a cooling mode, and a wind strength of the air conditioner determined based on the cooling tendency of the user, the user voice, the sensing data detected by the air conditioner, and the information regarding the weather of the area where the air conditioner is located.

5. The control method of claim 1, wherein the control command is obtained by inputting the user voice to an artificial intelligence model trained based on the cooling tendency of the user.

6. The control method of claim 1,
wherein the receiving comprises receiving, from the external server, the control command together with information regarding a voice message corresponding to the control command, and
wherein the controlling comprises controlling the air conditioner according to the control command, and outputting a voice message corresponding to the control command.

7. The control method of claim 1, further comprising:
detecting a user of the air conditioner,
wherein the transmitting comprises transmitting, to the external server, information regarding the detected user together with the user voice.

8. An air conditioner comprising:
a communicator;
a cooler;
a sensor configured to detect a state of an area where the air conditioner is located;
a memory storing at least one instruction; and
a processor configured to be electrically connected to the communicator, the cooler, and the memory and control the air conditioner,
wherein the processor, by executing the at least one instruction, is configured to:
obtaining a user voice including a state of a user,
based on the user voice including the state of the user being obtained, control the communicator to transmit the user voice to an external server,
control the communicator to transmit, to the external server, sensing data detected by the sensor and identification information of the air conditioner together with the user voice,
receive, from the external server via the communicator, a control command obtained using a cooling tendency of the user determined based on a usage history of the air conditioner and the state of the users, and
control the cooler based on the control command.

9. The air conditioner of claim 8,
wherein the processor is configured to, based on a user command for controlling the air conditioner being obtained before transmitting the user voice to the external server, control the communicator to transmit, to the external server, information regarding the user command, the sensing data detected by the air conditioner, and information regarding weather of an area where the air conditioner is located, and
wherein the cooling tendency of the user is determined every preset cycle based on the information regarding the user command, the sensing data detected by the air conditioner, and the information regarding the weather of the area where the air conditioner is located which are transmitted to the external server.

10. The air conditioner of claim 9,
wherein the cooling tendency of the user is a cooling tendency corresponding to the usage history of the air conditioner among a plurality of cooling tendencies, and
wherein the plurality of cooling tendencies include a rapid normal cooling tendency, a power-saving normal cooling tendency, a rapid windless cooling tendency, and a power-saving normal cooling tendency determined with a combination of a cooling mode, a wind strength, and a preference temperature set by the user.

11. The air conditioner of claim 9, wherein the control command comprises information regarding a set temperature, a cooling mode, and a wind strength of the air conditioner determined based on the cooling tendency of the user, the user voice, the sensing data detected by the air conditioner, and the information regarding the weather of the area where the air conditioner is located.

12. The air conditioner of claim 8, wherein the control command is obtained by inputting the user voice to an artificial intelligence model trained based on the cooling tendency of the user.

13. The air conditioner of claim 8, further comprising:
an output unit configured to output a voice message,
wherein the processor is configured to receive, from the external server, the control command together with information regarding a voice message corresponding to the control command, control the air conditioner according to the control command, and control the output unit to output a voice message corresponding to the control command.

\* \* \* \* \*